July 14, 1959 A. ZIMMERMANN 2,894,343

NOTING DEVICE, IN PARTICULAR FOR TELEPHONE NUMBERS

Filed Aug. 29, 1956

INVENTOR.

A. Zimmermann

BY Lowry + Rinehart

ATTYS.

United States Patent Office 2,894,343 Patented July 14, 1959

2,894,343

NOTING DEVICE, IN PARTICULAR FOR TELEPHONE NUMBERS

Albert Zimmermann, Zurich, Switzerland

Application August 29, 1956, Serial No. 606,831
Claims priority, application Switzerland August 14, 1956
1 Claim. (Cl. 40—86)

When telephones are used privately, a pad and pencil for noting telephone numbers extracted from the telephone directory are indispensable. But at public telephones, and in restaurants and the booths of the telephone administration a suitable noting device for noting telephone numbers is lacking.

The object of the present invention is an easily fixable noting device, in particular for telephone numbers.

According to the invention, this noting device comprises a casing with a reading window, and number carriers which are adjustable and are accommodated in the casing next to each other which enable the telephone numbers which are to be noted to be set and read on the window of the casing. Means for cancelling the set numbers are also provided.

Figure 1:
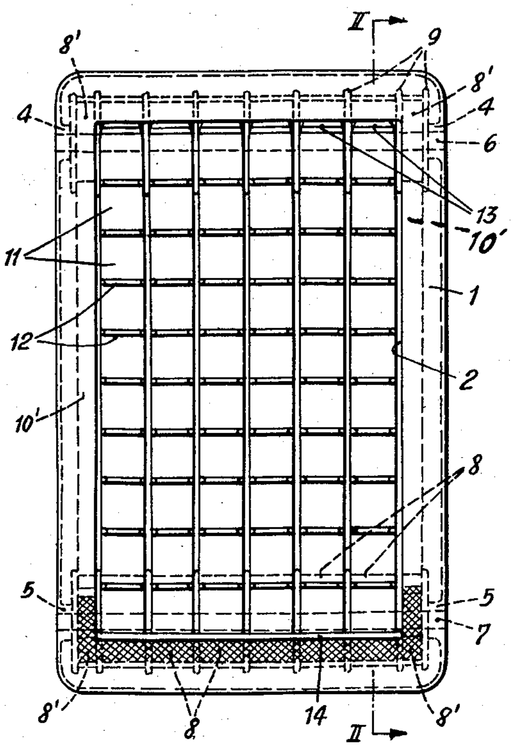
Figure 2:
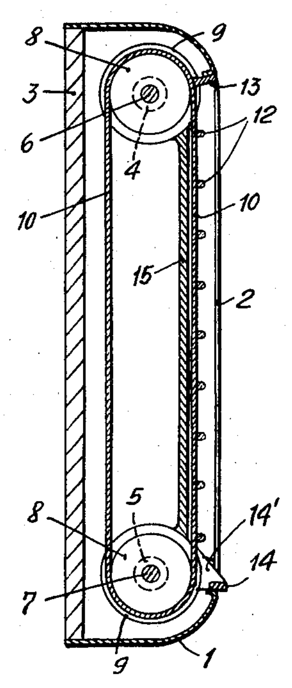

The drawing shows an example of an embodiment of the object of the invention, where Fig. 1 is a front view of the noting device, and Fig. 2 a section along the line II—II of Fig. 1.

The noting device represented here comprises a rectangular flat casing 1, provided at its front face with a rectangular aperture 2, serving as the operating and reading window. 3 is a base plate to be fixed to a wall; this plate is fixed to the casing. The shafts 6 and 7 are supported in bearings 4 and 5 on the inside of the side walls of the casing 1. Loose rotatable pulleys 8 are supported on the shafts 6 and 7, as well as two narrower pulleys 8' on each of the two outer sides. The intermediate plates 9 are supported on the shafts 6 and 7 between the pulleys 8 and 8' respectively, on each of the two outer sides. The number 10 indicates endless flexible bands, carrying the numbers, and running over the pulleys 8. The numbers can be printed on or punched out of the bands, or shown on them in any other way, embossed or recessed. In any case, the numbers should contrast with the background colour of the band. A finger-stop 12 for driving the band from above to below is accommodated on all bands underneath each number 11, so that the number to be noted can be set. A cancelling device 13 is provided above the number 1 on each band so that it projects above the band surface more than the finger-stop 12. Endless flexible bands 10' run over the two outer pulleys 8' and a cancelling beam 14 is fixed by means of fixing pieces 14' on the bands 10' so that it is parallel to the pulley shafts. The cancelling beam rests closely above the finger-stops, so that it does not collide with the stops and acts in conjunction with the cancelling stops 13. 15 is a support plate for the bands 10, which is solid with the intermediate plates 9.

It is a special feature of this embodiment that all controls, such as the bands 10 and 10', the finger stop 12, the cancelling stop 13, and the cancelling beam 14 are guided so as to ensure reliable operation and are accommodated in the casing in such a way as to be proof against damage.

The cancelling beam 14 could also be designed as the lower horizontal part of a rectangular frame, which can be pulled out of the casing at the top. This variant would be more suitable for noting devices designed for internal use, because the frame of the cancelling device could be easily bent in operation, particularly when pushing it in.

The embodiment described here can be used for telephone numbers with up to six digits. But if required it can also be designed for numbers with more than six digits. The setting of the desired number is effected by moving the bands by means of the finger from above to below. The number to be noted appears in the lowest field of the reading window, which can be framed in red at the sides and below. In order to cancel the set number, the cancelling beam 14, which forms in its basic position the lower edge of the result field, is moved from its lower position right up to the top, so that all cancelling stops 13 are moved up to the upper edge of the control aperture 2 of the casing. In this case the result field shows only zeros, while the ones are above in the control aperture, and the other numbers are arranged in a downwardly increasing sequence.

In order to prevent undesirable accidental displacement of the bands, particularly in the case of pocket-size instruments, leaf-spring pushing against the bands can be arranged on the inside of the casing.

The casing and bearing parts of the noting device can be made of metal, light metal, as die castings, moulded plastics, etc. The bands can be made of synthetic rubber or similar synthetic plastic materials.

The object of the invention described here can naturally be used everywhere where it is important to make a note of a number.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claim.

Having thus described my invention, I claim as new and desire to secure by Letters Patent:

A noting device for telephone numbers and the like comprising the combination of a casing provided with a reading window in the front portion thereof, a plurality of individually mounted and movable bands disposed in side by side relationship within said casing, separate roll means for mounting each of said bands, each of said bands also being sub-divided into a plurality of individual number bearing sections, outwardly projecting finger engageable stops affixed to the front face of said bands and separating said number bearing sections from each other, a support plate disposed adjacent to and slidably supporting the unexposed surface of the endless bands, separate cancelling stop means fixedly secured to the front face of each of said bands and projecting outwardly a greater distance from the front face of the bands than said finger-engaging stops, said stop means being normally disposed at one extremity of said window when said stop means is in a normal position of rest, a pair of independent, flexible bands similar to the first mentioned bands and mounted on opposite sides thereof, and a cancelling beam being mounted at opposite ends on said independent flexible bands transversely of said first mentioned bands for engaging the separate cancelling stop means.

References Cited in the file of this patent

UNITED STATES PATENTS

| | | |
|---|---|---|
| 773,675 | Powell et al. | Nov. 1, 1904 |
| 983,682 | Cheape | Feb. 7, 1911 |
| 2,349,070 | Axelrod | May 16, 1944 |
| 2,424,611 | Grayson | July 29, 1947 |
| 2,438,458 | Schumaker | Mar. 23, 1948 |
| 2,511,612 | Wilson | June 13, 1950 |
| 2,770,900 | Smith | Nov. 20, 1956 |